United States Patent
Ono et al.

(10) Patent No.: US 8,557,725 B2
(45) Date of Patent: Oct. 15, 2013

(54) METHOD FOR MANUFACTURING A REGENERATED FISCHER-TROPSCH SYNTHESIS CATALYST, AND HYDROCARBON MANUFACTURING METHOD

(75) Inventors: Hideki Ono, Tokyo (JP); Yoshiyuki Nagayasu, Tokyo (JP); Kazuaki Hayasaka, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/581,948

(22) PCT Filed: Feb. 14, 2011

(86) PCT No.: PCT/JP2011/053039
§ 371 (c)(1), (2), (4) Date: Aug. 30, 2012

(87) PCT Pub. No.: WO2011/108348
PCT Pub. Date: Sep. 9, 2011

(65) Prior Publication Data
US 2012/0322899 A1 Dec. 20, 2012

(30) Foreign Application Priority Data
Mar. 5, 2010 (JP) .................. P2010-049633

(51) Int. Cl.
*B01J 20/34* (2006.01)
*C07C 27/00* (2006.01)

(52) U.S. Cl.
USPC .................. 502/34; 502/20; 518/700

(58) Field of Classification Search
USPC ...................... 502/20, 34; 518/700
See application file for complete search history.

(56) References Cited

U.S. PATENT DOCUMENTS

| 4,499,209 A | 2/1985 | Hoek et al. | |
|---|---|---|---|
| 6,531,517 B1 * | 3/2003 | Wachter et al. | 518/709 |
| 2003/0144128 A1 | 7/2003 | Daage et al. | |
| 2004/0059008 A1 * | 3/2004 | Raje et al. | 518/726 |
| 2007/0105963 A1 | 5/2007 | Ikeda et al. | |
| 2010/0240777 A1 | 9/2010 | Fujimoto et al. | |

FOREIGN PATENT DOCUMENTS

| EP | 0 533 227 | | 3/1993 |
|---|---|---|---|
| JP | 59-102440 | A | 6/1984 |
| JP | 4-227847 | A | 8/1992 |
| JP | 5-208141 | A | 8/1993 |
| JP | 2005-525922 | A | 9/2005 |
| JP | 2007-270049 | A | 10/2007 |
| JP | 2008-73687 | A | 4/2008 |
| WO | 2005/099897 | A1 | 10/2005 |

OTHER PUBLICATIONS

International Search Report issued with respect to PCT/JP2011/053039, mailed May 10, 2011.
English-langauge translation of International Preliminary Report on Patentability issued with respect to PCT/JP2011/053039, mailed Oct. 11, 2012.
Moodley et al., "Carbon deposition as a deactivation mechanism of cobalt-based Fischer-Tropsch synthesis catalysts under realistic conditions", Applied Catalysis A: General., vol. 354, No. 1-2, Feb. 15, 2009, pp. 102-110.
Van Berge et al., "Oxidation of cobalt based Fisher-Tropsch catalysts as a deactivation mechanism.", Catalysis Today, vol. 58, No. 4, May 26, 2000, pp. 321-344.
Kiss et al., "Hydrothermal deactivation of silica-supported cobalt catalysts in Fischer-Tropsch synthesis.", Journal of Catalysis, vol. 217, No. 1, Mar. 25, 2003, pp. 127-140.
Chen et al., "Study on stability of Co/ZrO$_2$/SiO$_2$ catalyst of F-T synthesis", Studies in Surface Science and Catalysis, vol. 136, 2001, pp. 525-529.
Van De Loosdrecht et al., "Cobalt Fischer-Tropsch synthesis; Deactivation by oxidation?", Catalysis Today, vol. 123, No. 1-4, Apr. 12, 2007, pp. 293-302.
Saib et al., "Fundamental understanding of deactivation and regeneration of cobalt Fischer-Tropsch synthesis catalysts", Catalysis Today, vol. 154, No. 3-4, Mar. 15, 2010, pp. 271-282.

\* cited by examiner

*Primary Examiner* — Jafar Parsa
(74) *Attorney, Agent, or Firm* — Greenblum & Bernstein, P.L.C.

(57) ABSTRACT

A method for producing a regenerated Fischer-Tropsch synthesis catalyst obtained by regenerating a spent catalyst used in a Fischer-Tropsch synthesis reaction, comprising a steaming step of bringing the above spent catalyst into contact with a mixed gas comprising 1 to 30% by volume of steam and an inert gas at a pressure of atmospheric pressure to 5 MPa and a temperature of 150 to 350° C., the above spent catalyst being a spent catalyst in which cobalt and/or ruthenium is supported on a carrier comprising silica with an average pore diameter measured by a nitrogen adsorption method of 4 to 25 nm, and of which activity represented by an initial carbon monoxide conversion is 40 to 95%, based on the activity of a corresponding unused catalyst.

5 Claims, No Drawings

METHOD FOR MANUFACTURING A REGENERATED FISCHER-TROPSCH SYNTHESIS CATALYST, AND HYDROCARBON MANUFACTURING METHOD

TECHNICAL FIELD

The present invention relates to a method for producing a regenerated Fischer-Tropsch synthesis catalyst, and a method for producing hydrocarbons, using a catalyst produced by the production method.

BACKGROUND ART

In recent years, regulation on environmental load substances, such as sulfur components, contained in liquid fuels, such as gasoline and gas oil, has become rapidly severe. Therefore, the production of environment-friendly clean liquid fuels in which the content of sulfur components and aromatic hydrocarbons is low has become essential. One example of a method for producing such clean fuels includes the so-called Fischer-Tropsch synthesis method (hereinafter sometimes referred to as an "FT synthesis method") in which carbon monoxide is reduced by molecular hydrogen (hydrogen gas). By the FT synthesis method, liquid fuel base stocks that are rich in paraffin hydrocarbons and contain no sulfur components can be produced, and wax can also be produced. This wax can be converted to middle distillate (fuel base stocks, such as kerosene and gas oil) by hydrocracking.

A Fischer-Tropsch synthesis catalyst (hereinafter sometimes referred to as an "FT synthesis catalyst") that is a catalyst used in a Fischer-Tropsch synthesis reaction (hereinafter sometimes referred to as an "FT synthesis reaction") is generally a catalyst in which an active metal, such as iron, cobalt, or ruthenium, is supported on a carrier, such as silica or alumina (for example, see Patent Literature 1). In addition, it is reported that in an FT synthesis catalyst, catalyst performance is improved by using a second metal, in addition to the above active metal (for example, see Patent Literature 2). Examples of the second metal include sodium, magnesium, lithium, zirconium, and hafnium, and they are appropriately used according to a purpose, such as an improvement in the conversion of carbon monoxide, or an increase in chain growth probability that can be an indicator of a wax production amount. In the actual use of an FT synthesis catalyst, the combined use of the above second metal is considered, also in terms of keeping a decrease in the activity of the catalyst to a minimum during the FT synthesis reaction.

Examples of performance required for a practical FT synthesis catalyst mainly include catalytic activity, product selectivity, and catalyst life. For factors causing catalyst deterioration that shorten catalyst life among these, there are many examples of studies, such as deposition of a carbonaceous matter during reaction (for example, see Non Patent Literature 1), oxidation of the active metal (for example, see Non Patent Literature 2), and generation of a composite oxide by a reaction between an active metal and a carrier (for example, see Non Patent Literature 3). On the other hand, it is still difficult to recover the activity of a once deteriorated catalyst itself, and the present situation is that activity decrease must be compensated for by additionally introducing a new catalyst into a reaction apparatus. In this method, not only cost increases because the additional introduction of an expensive catalyst is necessary, but also the fact that the amount of the spent catalyst that eventually becomes waste increases has become a problem.

CITATION LIST

Patent Literature

Patent Literature 1: Japanese Patent Application Laid-Open Publication No. Hei-4-227847
Patent Literature 2: Japanese Patent Application Laid-Open Publication No. Sho-59-102440

Non Patent Literature

Non. Patent Literature 1: Appl. Catal. A: Gen., 354 (2009) 102-110
Non Patent Literature 2: Catal. Today., 58 (2000) 321-334
Non Patent Literature 3: J. Catal., 217 (2003) 127-140

SUMMARY OF INVENTION

Technical Problem

Because of circumstances as described above, the development of a simple method that regenerates an FT synthesis catalyst, which is used in an FT synthesis reaction and in which activity decreases, to a level at which the FT synthesis catalyst can be used again has been desired.

Solution to Problem

The present inventors have diligently studied over and over, in view of the above problems, and, as a result, found that activity can be recovered by treating a degraded FT synthesis catalyst with steam under specific conditions, leading to the completion of the present invention.

Specifically, the present invention provides a method for producing a regenerated Fischer-Tropsch synthesis catalyst obtained by regenerating a spent catalyst used in a Fischer-Tropsch synthesis reaction, comprising a steaming step of bringing the above spent catalyst into contact with a mixed gas comprising 1 to 30% by volume of steam and an inert gas at a pressure of atmospheric pressure to 5 MPa and a temperature of 150 to 350° C., the above spent catalyst being a spent catalyst in which cobalt and/or ruthenium is supported on a carrier comprising silica with an average pore diameter measured by a nitrogen adsorption method of 4 to 25 nm, and of which activity represented by an initial carbon monoxide conversion is 40 to 95%, based on the activity of a corresponding unused catalyst.

It is preferred that the method for producing a regenerated Fischer-Tropsch synthesis catalyst according to the present invention further comprises a reduction step of reducing the catalyst obtained through the above steaming step in a gas comprising molecular hydrogen or carbon monoxide.

In addition, it is preferred that the above carrier comprising silica further comprises 1 to 10% by mass of zirconium oxide, based on the mass of the catalyst.

In addition, it is preferred to carry out all steps for producing a regenerated Fischer-Tropsch synthesis catalyst, including the above steaming step, in a regeneration apparatus connected to a Fischer-Tropsch synthesis reaction apparatus.

Further, the present invention provides a method for producing hydrocarbons, comprising subjecting a feedstock comprising carbon monoxide and molecular hydrogen to a Fischer-Tropsch synthesis reaction in the presence of a regenerated Fischer-Tropsch synthesis catalyst produced by the above method.

Advantageous Effects of Invention

According to the present invention, a method for producing a regenerated FT synthesis catalyst that regenerates an FT synthesis catalyst, which is used in an FT synthesis reaction and of which activity decreases, to a level, at which the FT synthesis catalyst can be used again, by a simple method, and a method for producing hydrocarbons, using a regenerated FT synthesis catalyst produced by the method, are provided.

DESCRIPTION OF EMBODIMENTS

The present invention will be described below in detail, according to a preferred embodiment.

First, a spent FT synthesis catalyst used in a method for producing a regenerated FT synthesis catalyst according to the present invention will be described by describing a method for producing the catalyst at an unused stage.

A carrier constituting the above catalyst comprises silica. Examples of the carrier comprising silica include, in addition to silica, silica comprising a small amount of a porous inorganic oxide, such as alumina, titanic, or magnesia, or a metal component, such as sodium, magnesium, lithium, zirconium, or hafnium.

There is no particular limitation in the properties of the above carrier comprising silica, but a specific surface area measured by a nitrogen adsorption method is preferably 50 to 800 m$^2$/g, more preferably 150 to 500 m$^2$/g. A case where the specific surface area is less than 50 m$^2$/g is not preferred because an active metal may aggregate and the catalyst may become less active. On the other hand, a case where the specific surface area is more than 800 m$^2$/g is not preferred because rate of catalytic activity decrease due to deposition of the carbonaceous matter may increase.

In addition, the average pore diameter of the carrier comprising silica measured by a nitrogen adsorption method in the present invention is 4 to 25 nm, preferably 8 to 22 nm. A case where the average pore diameter is smaller than 4 nm is not preferred because the active metal may aggregate excessively out of the carrier pores, and therefore, there is a tendency that activity decreases from an initial stage of the reaction. On the other hand, also in a case where the average pore diameter is larger than 25 nm, the specific surface area may be small, and therefore, it may be difficult to support a predetermined amount of the active metal in a sufficiently dispersed state.

There is no particular limitation for the shape of the carrier, but considering practicality, generally, shapes, such as a spherical shape, a cylindrical shape, and irregular cylindrical shapes having a cross section of a three-leaf shape, a four-leaf shape, or the like, used in actual apparatuses in petroleum refining and petrochemical industry are preferred. In addition, there is no particular limitation also for its particle diameter, but the particle diameter is preferably 1 µm to 10 mm in terms of practicality. When an FT synthesis reaction is performed using a slurry-bed reaction apparatus preferably used in an FT synthesis reaction, the shape of the carrier is preferably a spherical shape, and its average particle diameter is preferably about 10 to 300 µm, more preferably about 30 to 150 µm, in terms of obtaining the flowability of the catalyst particles.

It is preferred that the above carrier comprising silica further comprises zirconium in terms of an improvement in activity and the suppression of a decrease in activity over time during use. In this case, the carrier is preferably one in which zirconium oxide is supported on particles comprising silica. The content of zirconium is preferably 1 to 10% by mass, more preferably 2 to 8% by mass, as zirconium oxide, based on the mass of the catalyst. When the above content is less than 1% by mass, there is a tendency that it is difficult to exhibit the above effects due to comprising zirconium, and when the above content is more than 10% by mass, there is a tendency that the pore volume of the carrier decreases, and therefore, these cases are not preferred. There is no particular limitation for a method for loading zirconium, and an impregnation, method typified by an incipient wetness method, an equilibrium adsorption method and the like can be used. As a zirconium compound used for loading, zirconyl sulfate, zirconyl acetate, zirconyl ammonium carbonate, zirconium trichloride, and the like can be used, and zirconyl ammonium carbonate and zirconyl acetate are more preferred. These zirconium compounds are generally used as a solution, preferably an aqueous solution for loading.

After the zirconium compound is loaded on the particles comprising silica, an excessive solution containing the zirconium compound and the particles comprising silica supporting the zirconium compound are separated by solid-liquid separation means such as filtration, as required, and the solid thus obtained is washed with water. The particles comprising silica supporting the zirconium compound is then dried. A drying method is not particularly limited and includes drying by heating in air, and drying by evacuation under reduced pressure. The drying is usually performed at a temperature of 100 to 200° C., preferably 110 to 130° C., for 2 to 24 hours, preferably 5 to 12 hours.

After the drying, the particles on which the zirconium compound is loaded is calcined to convert the zirconium compound to an oxide. The conditions of the calcination is not particularly limited, but the calcination can usually be performed under an air atmosphere at 340 to 600° C., preferably 400 to 450° C., for 1 to 5 hours. In the above manner, a carrier comprising silica on which zirconium oxide is supported is obtained.

Next, a compound comprising an active metal is loaded on the carrier obtained in the above manner. As the active metal, cobalt and/or ruthenium is preferred in terms of carbon monoxide conversion activity and product selectivity.

A compound comprising cobalt and/or ruthenium used in loading cobalt and/or ruthenium is not particularly limited, and salts of these metals and mineral acids or organic acids or complexes thereof can be used. Examples of a cobalt compound include cobalt nitrate, cobalt chloride, cobalt formate, cobalt acetate, cobalt propionate, and cobalt acetylacetonate. Examples of a ruthenium compound include ruthenium chloride, ruthenium nitrate, and tetraoxoruthenate.

There is no particular limitation in the loading amount of the cobalt and/or ruthenium compound, but the loading amount is generally 3 to 50% by mass, preferably 10 to 30% by mass, as the metal atoms, based on the mass of the catalyst. When the loading amount is less than 3% by mass, there is a tendency that the activity becomes insufficient, and when the loading amount is more than 50% by mass, there is a tendency that the aggregation of the active metal occurs, and the activity decreases.

There is no particular limitation for a method for loading an active metal compound, and an impregnation method typified by an incipient wetness method can be used.

After loading the active metal compound, an FT synthesis catalyst is usually obtained by drying the carrier supporting the active metal compound at a temperature of 100 to 200° C., preferably 110 to 130° C., for 2 to 24 hours, preferably 5 to 10 hours, and then calcining it under an air atmosphere at 340 to 600° C., preferably 400 to 450° C., for 1 to 5 hours to convert the active metal compound to an oxide.

It is general that the above FT synthesis catalyst is subjected to an FT synthesis reaction after the FT synthesis catalyst is activated by reduction under an atmosphere comprising molecular hydrogen to convert the active metal from the oxide to the metal, in order to provide sufficient activity for the FT synthesis reaction.

When the activation of the above catalyst is performed in an equipment for producing hydrocarbons by an FT synthesis method or an equipment attached thereto, the activated catalyst is subjected to an FT synthesis reaction as it is. On the other hand, for example, when the above activation is performed in a catalyst production equipment away from the equipment for producing hydrocarbons, it is general that the catalyst is shipped after stabilization treatment is performed, in order to prevent the catalyst from being deactivated due to contact with air during transfer and the like. Examples of this stabilization treatment include a method in which the outer surface of the activated catalyst is coated with wax or the like to break contact with air, or a method in which the outer surface of the activated catalyst is slightly oxidized to form an oxide film to prevent further oxidation due to contact with air. This activated and stabilized catalyst can be subjected to an FT synthesis reaction as it is.

Hydrocarbons are produced by an FT synthesis reaction, using the activated FT synthesis catalyst obtained in the above manner. This method for producing hydrocarbons is different from a method for producing hydrocarbons using a regenerated FT synthesis catalyst, described later in detail, only in that the catalyst used is an unused catalyst or a regenerated catalyst, and therefore, explanation is omitted in terms of avoiding redundancy.

For the above catalyst subjected to an FT synthesis reaction, there is a tendency that its activity decreases with the lapse of reaction time. A catalyst of which activity decreases to a specific range, compared with an unused catalyst, becomes a spent FT synthesis catalyst according to the method for producing a regenerated FT synthesis catalyst in this embodiment.

There are various apparatuses for performing regeneration and various forms of regeneration. It is possible to stop an FT synthesis reaction, and perform regeneration in a state in which a spent FT synthesis catalyst is still contained in the above reaction apparatus. Alternatively, it is possible to transfer a spent FT synthesis catalyst in an FT synthesis reaction apparatus to a regeneration apparatus connected to the FT synthesis reaction apparatus and perform regeneration in the regeneration apparatus. At this time, it is possible to transfer all of the catalyst in the FT synthesis reaction apparatus and regenerate it, or transfer part of the catalyst and regenerate it. In addition, it is possible to transfer a spent FT synthesis catalyst extracted from an FT synthesis reaction apparatus to a regeneration apparatus separate from the FT synthesis reaction apparatus and perform regeneration. In this case, it is preferred that the extracted spent FT synthesis catalyst is not brought into contact with air. In terms of breaking the contact of the extracted spent FT synthesis catalyst with air, it is preferred to transfer the extracted spent FT synthesis catalyst to a regeneration apparatus connected to the FT synthesis reaction apparatus and perform regeneration.

Among spent FT synthesis catalysts, catalysts suitable for the application of the present invention are spent FT synthesis catalysts of which activity represented by an initial carbon monoxide conversion is 40 to 95%, preferably 50 to 90%, based on the activity of a corresponding unused catalyst.

Here, "the initial carbon monoxide conversion" refers to a carbon monoxide conversion obtained when 2.5 hours elapses from the start of the reaction in an FT synthesis reaction carried out under predetermined reaction conditions. "The activity of a corresponding unused catalyst" to be based on refers to an initial carbon monoxide conversion in an FT synthesis reaction using a corresponding unused catalyst (an FT synthesis catalyst before being used in an FT synthesis reaction) performed under the same conditions as that in the case of the above spent FT synthesis catalyst. (The initial carbon monoxide conversion of a spent FT synthesis catalyst/ the initial carbon monoxide conversion of a corresponding unused catalyst)×100(%) is hereinafter referred to as "activity retention rate."

For a spent FT synthesis catalyst in which the activity retention rate is more than 95%, it still has activity with which it can be continuously used without regeneration, and the range of activity improvement due to regeneration is also limited, and therefore, it is rational that the spent FT synthesis catalyst is not made the target of regeneration. On the other hand, for a spent FT synthesis catalyst in which the activity retention rate is less than 40%, the possibility that activity thereof decrease is caused by a plurality of factors, such as deposition of a carbonaceous matter and the formation of a composite oxide between the active metal atom and the carrier, is high, and therefore, there is a tendency that it is difficult that the method of the present invention achieves an effect to recover the activity to the extent that the spent FT synthesis catalyst can be subjected to reuse.

Hydrocarbon compounds that are products of an FT synthesis reaction adhere to a spent FT synthesis catalyst extracted from an FT synthesis reaction apparatus. The hydrocarbon compounds comprise a wax component and therefore are solid at room temperature. In order to subject this spent FT synthesis catalyst to the method for producing a regenerated FT synthesis catalyst according to the present invention to sufficiently recover activity, first, it is preferred to perform the removal of the hydrocarbon compounds adhering to the catalyst, that is, deoiling.

Examples of a deoiling step include a method in which the catalyst containing the adhering hydrocarbon compounds is washed with a hydrocarbon oil comprising paraffin as a main component excluding a sulfur compound, a nitrogen compound, a chlorine compound, an alkali metal compound, or the like. Specifically, a product oil of an FT synthesis method with a boiling point of about 400° C. or lower, or normal paraffins having a similar structure are used as the washing oil in the step. Temperature and pressure during the washing are optionally determined, but when washing is performed with the above hydrocarbon oil heated to a temperature close to boiling point thereof, the effect of the washing is larger. An autoclave type vessel, a flow reactor type vessel, or the like can be used as an apparatus used in the deoiling step. In the deoiling step, it is preferred that 70% by mass or more of an oil component (in terms of the mass of a carbon) contained in the catalyst before deoiling is removed. When this removal rate is less than 70% by mass, diffusion of steam in the pores in the catalyst carrier in a steaming step is not sufficient, and there is a tendency that the recovery of activity does not become sufficient.

In the steaming step according to this embodiment, the spent FT synthesis catalyst which has undergone the above deoiling step is brought into contact with a mixed gas comprising steam and an inert gas. A steam concentration in the above mixed gas is 1 to 30% by volume, preferably 5 to 20% by volume. When the above steam concentration is less than 1% by volume, there is a tendency that the sufficient effect of activity recovery is not obtained. On the other hand, a case where the steam concentration is more than 30% by volume is not preferred because there is a tendency to cause the excessive aggregation of the active metal and the collapse of the structure of the carrier comprising silica. Examples of the above inert gas include a nitrogen gas. Molecular hydrogen or carbon monoxide may be further contained in the above mixed gas. However, comprising both of molecular hydrogen and carbon monoxide is not preferred because an FT synthesis reaction is caused, and there is the fear of temperature increase due to reaction heat.

Temperature in the above steaming step is 150 to 350° C., preferably 170 to 250° C. When the above temperature is lower than 150° C., there is a tendency that the effect of activity recovery is difficult to be obtained. On the other hand, a case where the above temperature is higher than 350° C. is not preferred because the oxidation of the active metal atoms tends to proceed due to oxidation action accompanying steaming to generate an inert species for carbon monoxide conversion.

Pressure in the above steaming step is atmospheric pressure to 5 MPa, preferably atmospheric pressure to 3 MPa. A case where the pressure is more than 5 MPa is not preferred because the unpreferred effect of the collapse of the structure of the carrier comprising silica exceeds the effect of activity recovery.

Time in the above steaming step is largely affected by temperature, an apparatus used, and the like and is not uniformly defined, but about 0.1 to 10 hours are selected.

In an FT synthesis reaction, water as a by-product is produced in a large amount, simultaneously with hydrocarbons, from the reaction of molecular hydrogen and carbon monoxide, and steam is always present in an FT synthesis reaction apparatus. Therefore, the FT synthesis catalyst is always exposed to steam during the reaction. It is totally unexpected that by performing the steaming step as described above on the spent FT synthesis catalyst of which activity has decreased with such a history, activity thereof is recovered.

In the above manner, a regenerated FT synthesis catalyst according to this embodiment can be obtained. This regenerated FT synthesis catalyst can also be subjected to an FT synthesis reaction as it is.

On the other hand, in this embodiment, the catalyst obtained through the steaming step may be further subjected to a reduction step of reducing said catalyst in a gas comprising molecular hydrogen or carbon monoxide to produce a regenerated FT synthesis catalyst. In the catalyst obtained through the steaming step, there is a tendency that part of the active metal atoms are oxidized from the metal to the oxide by weak oxidation action due to the steaming. When the catalyst is subjected to an FT synthesis reaction, at least part of the active metal atoms that become the oxide are reduced and become the metal during the reaction by the action of the molecular hydrogen and the carbon monoxide that are feedstocks of the reaction. But, when it is intended to obtain a higher degree of reduction of the active metal atoms (100× active metal atoms in a metal state/all active metal atoms (mole %)) and exhibit higher activity from the starting period of the FT synthesis reaction, it is effective to further perform the above reduction step.

The gas comprising molecular hydrogen or carbon monoxide that is an atmosphere in the above reduction step is not particularly limited, but includes a hydrogen gas, a mixed gas of a hydrogen gas and an inert gas, such as a nitrogen gas, carbon monoxide, and a mixed gas of carbon monoxide and an inert gas, such as a nitrogen gas. When the above gas does not comprise molecular hydrogen and comprises carbon monoxide, there is a tendency that a higher degree of reduction of the active metal atoms is obtained because there is no production of water that is presumed to be produced as a by-product in the case of reduction with molecular hydrogen and inhibit the reduction of the active metal atoms. When the above gas comprises both molecular hydrogen and carbon monoxide, it is not preferred because an FT synthesis reaction is caused in the reduction step, and there is the fear of temperature rising due to reaction heat, and the like. However, a case where the respective components are mixed in slight amounts is permitted.

When a gas comprising molecular hydrogen is used as the atmosphere in the above reduction step, reduction temperature is preferably 250 to 500° C., more preferably 350 to 450° C. When the reduction temperature is lower than 250° C., there is a tendency that the effect of increasing the degree of reduction of the active metal atoms is not sufficiently obtained. On the other hand, when the reduction temperature is higher than 500° C., aggregation of the active metal proceeds excessively, and therefore, there is a tendency that the activity decreases.

When a gas comprising carbon monoxide is used as the atmosphere in the above reduction step, the reduction temperature is preferably 200 to 400° C., more preferably 250 to 350° C. When the above temperature is lower than 200° C., there is a tendency that a sufficient degree of reduction of the active metal atoms is difficult to be obtained. On the other hand, when the above temperature is higher than 400° C., there is a tendency that it is easy to produce a carbon typified by a carbon nanotube from carbon monoxide.

In the above reduction step, the pressure of the atmosphere is not particularly limited, but is generally about atmospheric pressure to 5 MPa. In addition, reduction time largely depends on reduction temperature, an apparatus used, and the like, and therefore, it is difficult to uniformly define the reduction time, but the reduction time is generally about 0.5 to 30 hours.

In the above manner, the regenerated FT synthesis catalyst according to this embodiment is obtained. As in one described in the explanation of the unused FT synthesis catalyst described above, also in the regenerated FT synthesis catalyst, when it is necessary to perform transfer and the like accompanied by contact with air for the catalyst in an activated state, it is preferred to perform transfer and the like after performing stabilization treatment similar to that for the unused catalyst. (The initial carbon monoxide conversion of a regenerated FT synthesis catalyst/the initial carbon monoxide conversion of a corresponding unused catalyst)×100(%) is hereinafter referred to as "activity recovery rate."

Next, a method for producing hydrocarbons by an FT synthesis reaction, using the regenerated FT synthesis catalyst according to this embodiment, and using carbon monoxide and molecular hydrogen (hydrogen gas) as feedstocks, will be described. The above method for producing hydrocarbons is not particularly limited, and a publicly known method can be used. As a reaction apparatus, a fixed-bed reaction apparatus or a slurry-bed reaction apparatus is preferred. In addition, it is preferred that the reaction is performed under conditions in which the conversion of the carbon monoxide that constitutes a feedstock gas is made 50% or more, and it is further preferred that the reaction is performed in the range of 70 to 90%. There is basically no difference from a case where an unused catalyst is used, except that the regenerated catalyst is used as a catalyst.

The method for producing hydrocarbons, using the regenerated FT synthesis catalyst according to this embodiment, will be described below, according to an example using a slurry-bed reaction apparatus.

As the reaction apparatus, for example, a bubble column type fluidized-bed reaction apparatus can be used. A slurry in which the regenerated FT synthesis catalyst according to this embodiment is suspended in hydrocarbons (usually FT synthesis hydrocarbons produced by said reaction apparatus) that are liquid at reaction temperature is contained in the bubble column type fluidized-bed reaction apparatus, and a mixed gas of a carbon monoxide gas and molecular hydrogen (generally a synthesis gas obtained by the reforming of hydrocarbons, such as a natural gas) is introduced therein from the lower portion of a reaction column. The above mixed gas is dissolved in the above hydrocarbons and is in contact with the catalyst, while becoming bubbles and rising in the reaction column, and thus, hydrocarbons are produced. In addition, the slurry is stirred by the rise of the bubbles of the above mixed gas, and a fluidized state is kept. A cooling pipe, inside of which a cooling medium for removing reaction heat flows, is installed in the above reaction column, and reaction heat is removed by heat exchange.

The reaction temperature of the FT synthesis reaction can be determined by a targeted carbon monoxide conversion, but is preferably 150 to 300° C., more preferably 170 to 250° C.

Reaction pressure is preferably 0.5 to 5.0 MPa, more preferably 2.0 to 4.0 MPa. When the reaction pressure is less than 0.5 MPa, there is a tendency that the carbon monoxide conversion is difficult to become 50% or more, and when the reaction pressure is more than 5.0 MPa, it is not preferred because there is a tendency that it is easy to cause local heat generation.

The ratio (molar ratio) of molecular hydrogen/carbon monoxide in the feedstock gas is preferably in the range of 0.5 to 4.0, more preferably 1.0 to 2.5. When the above molar ratio is less than 0.5, there is a tendency that the reaction temperature raised and the catalyst is deactivated, and when the above molar ratio is more than 4.0, there is a tendency that the production amount of methane that is an undesirable by-product increases.

The gas space velocity of the feedstock gas is preferably 500 to 5000 h$^{-1}$, more preferably 1000 to 2500 h$^{-1}$. When the gas space velocity is less than 500 h$^{-1}$, productivity for the same catalyst amount is low, and a case where the gas space velocity is more than 5000 h$^{-1}$ is not preferred because the conversion of carbon monoxide is difficult to become 50% or more.

The regenerated FT synthesis catalyst according to this embodiment has a high activity recovery rate. In addition, the above regenerated FT synthesis catalyst has high chain growth probability ($\alpha$), and by using this catalyst, hydrocarbons comprising normal paraffins corresponding to a wax fraction, a middle distillate (kerosene and gas oil fractions), and a naphtha fraction as a main component can be obtained with high yield together with a small amount of gaseous hydrocarbons. Particularly, hydrocarbons rich in a wax fraction and a middle distillate can be obtained with high yield.

The present invention is not limited to the above preferred embodiment, and changes can be appropriately made without departing from the spirit of the present invention.

EXAMPLES

The present invention will be more specifically described below, based on Examples and Comparative Examples, but the present invention is not limited to the following Examples.

Example 1

Preparation of Regenerated FT Synthesis Catalyst

A fixed-bed flow type reaction apparatus was charged with 25 g of a powdery Co/SiO$_2$—ZrO$_2$ catalyst (average pore diameter: 11.2 nm, ZrO$_2$ loading amount: 8.5% by mass (based on the mass of the catalyst)) spent in an FT synthesis reaction and deoiled, of which an activity retention rate measured by a method described later was 92.3%, and steaming was performed under the flow of a mixed gas with a volume ratio of steam/nitrogen gas=9.8/90.2 at a total pressure of 1.5 MPa at 200° C. for 1 hour (steaming step). Then, reduction of the catalyst after steaming was performed in the same reaction apparatus under a hydrogen gas flow at 400° C. for 3 hours (reduction step). Thus, a regenerated FT synthesis catalyst was obtained.

<FT Synthesis Reaction Evaluation>

5 g of the regenerated FT synthesis catalyst obtained by the above was transferred, together with 30 ml of cetane, to an autoclave with an internal volume of 100 ml under a nitrogen gas atmosphere, and an FT synthesis reaction was performed. A mixed gas in which hydrogen gas/carbon monoxide was 2/1 (molar ratio) was used as a feedstock and flown continuously through the autoclave at W (catalyst mass)/F (synthesis gas flow rate)=3 g·h/mol, and the reaction was conducted at a temperature of 230° C., a pressure of 2.3 MPa, and a stirring speed of 800 rpm. A gas composition at the outlet of the autoclave was analyzed over time by gas chromatography, and the above-described initial carbon monoxide conversion was calculated from this analysis data. In addition, the chain growth probability $\alpha$ was obtained from the analysis of products by a conventional method. In addition, an FT synthesis reaction was separately performed by a method similar to that of the above, using a corresponding spent FT synthesis catalyst and a corresponding unused catalyst, and the initial carbon monoxide conversion was similarly obtained. Then, the activity retention rate of the spent FT synthesis catalyst, and the activity recovery rate of the regenerated FT synthesis catalyst were calculated according to the above-described definition. The results are shown in Table 1.

Example 2

Preparation of Regenerated FT Synthesis Catalyst

A fixed-bed flow type reaction apparatus was charged with 25 g of a powdery Co/SiO$_2$—ZrO$_2$ catalyst (average pore diameter: 12.4 nm, ZrO$_2$ loading amount: 7.9% by mass) spent in an FT synthesis reaction and deoiled, of which an activity retention rate measured by a method described later was 50.1% by mass, and steaming was performed under the flow of a mixed gas with a volume ratio of steam/nitrogen gas=11.2/88.8 at a total pressure of 1.6 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by an operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 3

Preparation of Regenerated FT Synthesis Catalyst

A fixed-bed flow type reaction apparatus was charged with 25 g of a powdery $Co/SiO_2$—$ZrO_2$ catalyst (average pore diameter: 20.4 nm, $ZrO_2$ loading amount: 6.6% by mass) spent in an FT synthesis reaction and deoiled, of which an activity retention rate measured by a method described later was 78.4% by mass, and steaming was performed under the flow of a mixed gas with a volume ratio of steam/nitrogen=9.4/90.6 at a total pressure of 0.5 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 4

Preparation of Regenerated FT Synthesis Catalyst

A fixed-bed flow type reaction apparatus was charged with 25 g of a powdery $Co/SiO_2$—$ZrO_2$ catalyst (average pore diameter: 8.9 nm, $ZrO_2$ loading amount: 7.1% by mass) spent in an FT synthesis reaction and deoiled, of which an activity retention rate measured by a method described later was 77.2% by mass, and steaming was performed under the flow of a mixed gas with a volume ratio of steam/nitrogen=8.2/91.8 at a total pressure of 0.5 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 5

Preparation of Regenerated FT Synthesis Catalyst

A fixed-bed flow type reaction apparatus was charged with 25 g of a powdery $Co/SiO_2$—$ZrO_2$ catalyst (average pore diameter: 18.4 nm, $ZrO_2$ loading amount: 9.4% by mass) spent in an FT synthesis reaction and deoiled, of which an activity retention rate measured by a method described later was 71.2% by mass, and steaming was performed under the flow of a mixed gas with a volume ratio of steam/nitrogen=6.5/93.5 at a total pressure of 1.6 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 6

Preparation of Regenerated FT Synthesis Catalyst

A fixed-bed flow type reaction apparatus was charged with 25 g of a powdery $Co/SiO_2$—$ZrO_2$ catalyst (average pore diameter: 17.6 nm, $ZrO_2$ loading amount: 2.6% by mass) spent in an FT synthesis reaction and deoiled, of which an activity retention rate measured by a method described later was 71.1% by mass, and steaming was performed under the flow of a mixed gas with a volume ratio of steam/nitrogen=7.4/92.6 at a total pressure of 1.6 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 7

Preparation of Regenerated FT Synthesis Catalyst

A fixed-bed flow type reaction apparatus was charged with 25 g of a powdery $Co/SiO_2$—$ZrO_2$ catalyst (average pore diameter: 14.3 nm, $ZrO_2$ loading amount: 7.1% by mass) spent in an FT synthesis reaction and deoiled, of which an activity retention rate measured by a method described later was 76.6% by mass, and steaming was performed under the flow of a mixed gas with a volume ratio of steam/nitrogen=27.1/72.9 at a total pressure of 2.3 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 8

Preparation of Regenerated FT Synthesis Catalyst

A fixed-bed flow type reaction apparatus was charged with 25 g of a powdery $Co/SiO_2$—$ZrO_2$ catalyst (average pore diameter: 15.2 nm, $ZrO_2$ loading amount: 6.6% by mass) spent in an FT synthesis reaction and deoiled, of which an activity retention rate measured by a method described later was 74.5% by mass, and steaming was performed under the flow of a mixed gas with a volume ratio of steam/nitrogen=4.4/95.6 at a total pressure of 2.2 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 9

Preparation of Regenerated FT Synthesis Catalyst

A fixed-bed flow type reaction apparatus was charged with 25 g of a powdery $Co/SiO_2$—$ZrO_2$ catalyst (average pore diameter: 10.2 nm, $ZrO_2$ loading amount: 2.3% by mass) spent in an FT synthesis reaction and deoiled, of which an activity retention rate measured by a method described later was 72.3% by mass, and steaming was performed under the flow of a mixed gas with a volume ratio of steam/nitrogen=10.5/89.5 at a total pressure of 2.5 MPa at 200° C. for 1 hour, Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 10

Preparation of Regenerated FT Synthesis Catalyst

A fixed-bed flow type reaction apparatus was charged with 25 g of a powdery $Co/SiO_2$—$ZrO_2$ catalyst (average pore diameter: 10.9 nm, $ZrO_2$ loading amount: 3.8% by mass) spent in an FT synthesis reaction and deoiled, of which an activity retention rate measured by a method described later was 72.8% by mass, and steaming was performed under the flow of a mixed gas with a volume ratio of steam/nitrogen=11.4/88.6 at a total pressure of 0.1 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 11

Preparation of Regenerated FT Synthesis Catalyst

A fixed-bed flow type reaction apparatus was charged with 25 g of a powdery $Co/SiO_2$—$ZrO_2$ catalyst (average pore diameter: 16.4 nm, $ZrO_2$ loading amount: 5.1% by mass) spent in an FT synthesis reaction and deoiled, of which an activity retention rate measured by a method described later was 76.4% by mass, and steaming was performed under the flow of a mixed gas with a volume ratio of steam/nitrogen=8.8/91.2 at a total pressure of 2.2 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 12

Preparation of Regenerated FT Synthesis Catalyst

A fixed-bed flow type reaction apparatus was charged with 25 g of a powdery $Co/SiO_2$—$ZrO_2$ catalyst (average pore diameter: 16.9 nm, $ZrO_2$ loading amount: 4.7% by mass) spent in an FT synthesis reaction and deoiled, of which an activity retention rate measured by a method described later was 77.4% by mass, and steaming was performed under the flow of a mixed gas with a volume ratio of steam/nitrogen=7.6/92.4 at a total pressure of 2.1 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 13

Preparation of Regenerated FT Synthesis Catalyst

A fixed-bed flow type reaction apparatus was charged with 25 g of a powdery $Co/SiO_2$—$ZrO_2$ catalyst (average pore diameter: 18.4 nm, $ZrO_2$ loading amount: 13.2% by mass) spent in an FT synthesis reaction and deoiled, of which an activity retention rate measured by a method described later was 76.4% by mass, and steaming was performed under the flow of a mixed gas with a volume ratio of steam/nitrogen=8.8/91.2 at a total pressure of 1.6 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Example 14

Preparation of Regenerated FT Synthesis Catalyst

A fixed-bed flow type reaction apparatus was charged with 25 g of a powdery $Co/SiO_2$—$ZrO_2$ catalyst (average pore diameter: 17.6 nm, $ZrO_2$ loading amount: 0.7% by mass) spent in an FT synthesis reaction and deoiled, of which an activity retention rate measured by a method described later was 77.1% by mass, and steaming was performed under the flow of a mixed gas with a volume ratio of steam/nitrogen=7.6/92.4 at a total pressure of 1.6 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, the activity recovery rate of the regenerated FT synthesis catalyst, and the chain growth probability α in the case where the regenerated FT synthesis catalyst was used were calculated as in Example 1. The results are shown in Table 1.

Comparative Example 1

Preparation of Regenerated FT Synthesis Catalyst

A fixed-bed flow type reaction apparatus was charged with 25 g of a powdery $Co/SiO_2$—$ZrO_2$ catalyst (average pore diameter: 12.4 nm, $ZrO_2$ loading amount: 8.2% by mass) spent in an FT synthesis reaction and deoiled, of which an activity retention rate measured by a method described later was 35.8% by mass, and steaming was performed under the flow of a mixed gas with a volume ratio of steam/nitrogen=11.2/88.8 at a total pressure of 1.6 MPa at 210° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, and the activity recovery rate of the regenerated FT synthesis catalyst were calculated as in Example 1. The results are shown in Table 1.

Comparative Example 2

Preparation of Regenerated FT Synthesis Catalyst

A fixed-bed flow type reaction apparatus was charged with 25 g of a powdery $Co/SiO_2$—$ZrO_2$ catalyst (average pore diameter: 14.3 nm, $ZrO_2$ loading amount: 7.1% by mass) spent in an FT synthesis reaction and deoiled, of which an activity retention rate measured by a method described later was 75.3% by mass, and steaming was performed under the flow of a mixed gas with a volume ratio of steam/nitrogen=41/

59 at a total pressure of 2.3 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, and the activity recovery rate of the regenerated FT synthesis catalyst were calculated as in Example 1. The results are shown in Table 1.

Comparative Example 3

Preparation of Regenerated FT Synthesis Catalyst

A fixed-bed flow type reaction apparatus was charged with 25 g of a powdery $Co/SiO_2$—$ZrO_2$ catalyst (average pore diameter: 15.2 nm, $ZrO_2$ loading amount: 6.6% by mass) spent in an FT synthesis reaction and deoiled, of which an activity retention rate measured by a method described later was 74.1% by mass, and steaming was performed under the flow of a mixed gas with a volume ratio of steam/nitrogen=0.4/99.6 at a total pressure of 2.2 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, and the activity recovery rate of the regenerated FT synthesis catalyst were calculated as in Example 1. The results are shown in Table 1.

Comparative Example 4

Preparation of Regenerated FT Synthesis Catalyst

A fixed-bed flow type reaction apparatus was charged with 25 g of a powdery $Co/SiO_2$—$ZrO_2$ catalyst (average pore diameter: 10.9 nm, $ZrO_2$ loading amount: 3.8% by mass) spent in an FT synthesis reaction and deoiled, of which an activity retention rate measured by a method described later was 70.2% by mass, and steaming was performed under the flow of a mixed gas with a volume ratio of steam/nitrogen=11.4/88.6 at a total pressure of 5.5 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, and the activity recovery rate of the regenerated FT synthesis catalyst were calculated as in Example 1. The results are shown in Table 1.

Comparative Example 5

Preparation of Regenerated FT Synthesis Catalyst

A fixed-bed flow type reaction apparatus was charged with 25 g of a powdery $Co/SiO_2$—$ZrO_2$ catalyst (average pore diameter: 12.3 nm, $ZrO_2$ loading amount: 6.3% by mass) spent in an FT synthesis reaction and deoiled, of which an activity retention rate measured by a method described later was 75.2% by mass, and steaming was performed under the flow of a mixed gas with a volume ratio of steam/nitrogen=4.4/95.6 at a total pressure of 2.2 MPa at 362° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, and the activity recovery rate of the regenerated FT synthesis catalyst were calculated as in Example 1. The results are shown in Table 1.

Comparative Example 6

Preparation of Regenerated FT Synthesis Catalyst

A fixed-bed flow type reaction apparatus was charged with 25 g of a powdery $Co/SiO_2$—$ZrO_2$ catalyst (average pore diameter: 14.3 nm, $ZrO_2$ loading amount: 5.4% by mass) spent in an FT synthesis reaction and deoiled, of which an activity retention rate measured by a method described later was 75.2% by mass, and steaming was performed under the flow of a mixed gas with a volume ratio of steam/nitrogen=4.4/95.6 at a total pressure of 2.1 MPa at 121° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, and the activity recovery rate of the regenerated FT synthesis catalyst were calculated as in Example 1. The results are shown in Table 1.

Comparative Example 7

Preparation of Regenerated FT Synthesis Catalyst

A fixed-bed flow type reaction apparatus was charged with 25 g of a powdery $Co/SiO_2$—$ZrO_2$ catalyst (average pore diameter: 27.2 nm, $ZrO_2$ loading amount: 6.6% by mass)

spent in an FT synthesis reaction and deoiled, of which an activity retention rate measured by a method described later was 75.3% by mass, and steaming was performed under the flow of a mixed gas with a volume ratio of steam/nitrogen=9.4/90.6 at a total pressure of 0.5 MPa at 200° C. for 1 hour. Next, reduction was performed in the same reaction apparatus under a hydrogen gas flow at 400° C. for 3 hours. Thus, a regenerated FT synthesis catalyst was obtained.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, and the activity recovery rate of the regenerated FT synthesis catalyst were calculated as in Example 1. The results are shown in Table 1.

FT Synthesis Reaction Evaluation

An FT synthesis reaction was performed by the operation similar to that of Example 1, except that the regenerated FT synthesis catalyst obtained by the above was used as a catalyst. In addition, an FT synthesis reaction was separately performed by a method similar to that of the above, using a corresponding spent FT synthesis catalyst and a corresponding unused catalyst. Then, the activity retention rate of the spent FT synthesis catalyst, and the activity recovery rate of the regenerated FT synthesis catalyst were calculated as in Example 1. The results are shown in Table 1.

TABLE 1

| | Activity retention rate of spent catalyst (%) | Average pore diameter (nm) | $ZrO_2$ loading amount (% by mass - based on catalyst) | Steam concentration (% by volume) | Steaming total pressure (MPa) | Steaming temperature (° C.) | Activity recovery rate of regenerated catalyst (%) | Chain growth probability of regenerated catalyst |
|---|---|---|---|---|---|---|---|---|
| Example 1 | 92.3 | 11.2 | 8.5 | 9.8 | 1.5 | 200 | 97.6 | 0.92 |
| Example 2 | 50.1 | 12.4 | 7.9 | 11.2 | 1.6 | 200 | 76.2 | 0.91 |
| Example 3 | 78.4 | 20.4 | 6.6 | 9.4 | 0.5 | 200 | 89.5 | 0.92 |
| Example 4 | 77.2 | 8.9 | 7.1 | 8.2 | 0.5 | 200 | 89.9 | 0.91 |
| Example 5 | 71.2 | 18.4 | 9.4 | 6.5 | 1.6 | 200 | 86.6 | 0.90 |
| Example 6 | 71.1 | 17.6 | 2.6 | 7.4 | 1.6 | 200 | 89.6 | 0.91 |
| Example 7 | 76.6 | 14.3 | 7.1 | 27.1 | 2.3 | 200 | 87.6 | 0.91 |
| Example 8 | 74.5 | 15.2 | 6.6 | 4.4 | 2.2 | 200 | 90.1 | 0.92 |
| Example 9 | 72.3 | 10.2 | 2.3 | 10.5 | 2.5 | 200 | 90.2 | 0.92 |
| Example 10 | 72.8 | 10.9 | 3.8 | 11.4 | 0.1 | 200 | 88.7 | 0.91 |
| Example 11 | 76.4 | 16.4 | 5.1 | 8.8 | 2.2 | 200 | 90.5 | 0.91 |
| Example 12 | 77.4 | 16.9 | 4.7 | 7.6 | 2.1 | 200 | 89.8 | 0.91 |
| Example 13 | 76.4 | 18.4 | 13.2 | 8.8 | 1.6 | 200 | 82.8 | 0.91 |
| Example 14 | 77.1 | 17.6 | 0.7 | 7.6 | 1.6 | 200 | 82.1 | 0.91 |
| Comparative Example 1 | 35.8 | 12.4 | 8.2 | 11.2 | 1.6 | 200 | 40.5 | — |
| Comparative Example 2 | 75.3 | 14.3 | 7.1 | 41 | 2.3 | 200 | 69.8 | — |
| Comparative Example 3 | 74.1 | 15.2 | 6.6 | 0.4 | 2.2 | 200 | 73.6 | — |
| Comparative Example 4 | 70.2 | 10.9 | 3.8 | 11.4 | 5.5 | 200 | 67.5 | — |
| Comparative Example 5 | 75.2 | 12.3 | 6.3 | 4.4 | 2.2 | 362 | 68.8 | — |
| Comparative Example 6 | 75.2 | 14.3 | 5.4 | 4.4 | 2.1 | 121 | 75.2 | — |
| Comparative Example 7 | 75.3 | 27.2 | 6.6 | 9.4 | 0.5 | 200 | 75.1 | — |
| Comparative Example 8 | 74.2 | 3.3 | 7.1 | 8.2 | 0.5 | 200 | 70.9 | — |

Comparative Example 8

Preparation of Regenerated FT Synthesis Catalyst

A fixed-bed flow type reaction apparatus was charged with 25 g of a powdery Co/$SiO_2$—$ZrO_2$ catalyst (average pore diameter: 3.3 nm, $ZrO_2$ loading amount: 7.1% by mass) spent in an FT synthesis reaction and deoiled, of which an activity retention rate measured by a method described later was 74.2% by mass, and steaming was performed under the flow of a mixed gas with a volume ratio of steam/nitrogen=8.2/91.8 at a total pressure of 0.5 MPa at 200° C. for 1 hour. Next, reduction was performed in the same reaction apparatus under a hydrogen gas flow at 400° C. for 3 hours. Thus, a regenerated FT synthesis catalyst was obtained.

From the results described in Table 1, it is clearly shown that regenerated FT synthesis catalysts having high activity and high chain propagation probability can be obtained by regenerating spent FT synthesis catalysts according to the conditions of the method for producing regenerated Fischer-Tropsch synthesis catalyst of the present invention.

Industrial Applicability

As described above, according to the present invention, a method for producing a regenerated FT synthesis catalyst that regenerates an FT synthesis catalyst, which is used in an FT synthesis reaction and in which activity decreases, to a level, at which the FT synthesis catalyst can be used again, by a simple method, and a method for producing hydrocarbons, using a regenerated FT synthesis catalyst produced by the method, are provided.

The invention claimed is:

1. A method for producing a regenerated Fischer-Tropsch synthesis catalyst obtained by regenerating a spent catalyst used in a Fischer-Tropsch synthesis reaction, comprising
   bringing the spent catalyst into contact with a mixed gas comprising 1 to 30% by volume of steam and an inert gas at a pressure of atmospheric pressure to 5 MPa and a temperature of 150 to 350° C., the spent catalyst being a spent catalyst in which cobalt and/or ruthenium is supported on a carrier comprising silica with an average pore diameter measured by a nitrogen adsorption method of 4 to 25 nm, and of which activity represented by an initial carbon monoxide conversion is 40 to 95%, based on the activity of a corresponding unused catalyst, wherein the carrier comprising silica further comprises 1 to 10% by mass of zirconium oxide, based on the mass of the catalyst.

2. The method according to claim 1, further comprising reducing the catalyst obtained through bringing the spent catalyst into contact with the mixed gas comprising 1 to 30% by volume of steam and an inert gas at a pressure of atmospheric pressure to 5 MPa and a temperature of 150 to 350° C. in a gas comprising molecular hydrogen or carbon monoxide.

3. The method according to claim 1, wherein the method is carried out in a regeneration apparatus connected to a Fischer-Tropsch synthesis reaction apparatus.

4. A method for producing hydrocarbons, comprising subjecting a feedstock comprising carbon monoxide and molecular hydrogen to a Fischer-Tropsch synthesis reaction in the presence of a regenerated Fischer-Tropsch synthesis catalyst produced by the method according to claim 1.

5. The method according to claim 2, wherein the method is carried out in a regeneration apparatus connected to a Fischer-Tropsch synthesis reaction apparatus.

\* \* \* \* \*